United States Patent [19]
Anderson

[11] Patent Number: 6,086,682
[45] Date of Patent: Jul. 11, 2000

[54] VACUUM AID FOR LICE AND NIT REMOVAL SYSTEM

[76] Inventor: Daniel P. Anderson, 3206 N. Averill, Flint, Mich. 48506

[21] Appl. No.: 09/290,638

[22] Filed: Apr. 12, 1999

Related U.S. Application Data

[60] Provisional application No. 60/081,452, Apr. 13, 1998.
[51] Int. Cl.[7] .................................. B08B 5/04; A47L 9/06
[52] U.S. Cl. .................................. 134/6; 134/21; 134/42; 15/402
[58] Field of Search .................................. 134/6, 21, 42; 15/402

[56] References Cited

U.S. PATENT DOCUMENTS

| | | | |
|---|---|---|---|
| 876,766 | 1/1908 | Blaisdell | 15/402 |
| 918,929 | 4/1909 | Thurman | 15/402 |
| 1,015,894 | 1/1912 | Keller | 15/402 |
| 1,525,106 | 2/1925 | Smythe | 15/402 |
| 1,770,749 | 7/1930 | Engberg et al. | 15/402 |
| 1,859,132 | 5/1932 | Fechtenburg | 15/402 |
| 2,276,886 | 3/1942 | Smith | 15/402 |
| 2,780,829 | 2/1957 | Cohen | 15/402 |
| 2,953,808 | 9/1960 | Carmack | 15/402 |
| 4,190,924 | 3/1980 | Nicholson | 15/402 |
| 4,485,583 | 12/1984 | Planty | 15/402 |
| 4,799,863 | 1/1989 | Gannon | 15/402 |
| 5,074,006 | 12/1991 | Eremita | 15/402 |
| 5,502,873 | 4/1996 | Hogan | 15/402 |

*Primary Examiner*—Zeinab El-Arini
*Attorney, Agent, or Firm*—Howard & Howard

[57] ABSTRACT

A nit and lice removal system for use with a vacuum cleaner. The removal system has one device, which is adjacent to the vacuum cleaner, having closely spaced teeth that can be drawn through an individuals hair to dislodge nits and lice for suction into the vacuum cleaner. Another device for attachment to a vacuum hose has a flat flexible surface for engaging the skin without discomfort to the user. The latter device is very effective for removing live lice.

9 Claims, 4 Drawing Sheets

VACUUM AID FOR LICE AND NIT REMOVAL SYSTEM

This application claims priority to provisional application Ser. No. 60/081,452; which was filed on Apr. 13, 1998.

BACKGROUND OF THE INVENTION

The present invention relates to the removal of lice from individuals. More particularly, the present invention relates to the removal of lice from the hair and of individuals. Even more particularly, the present invention hereof relates to a system for dislodging and removing lice, including eggs and nits, from the hair of individuals.

A louse is a contagion, the plurality of which is called lice. Lice, typically, migrate within the hair strands of individuals and other animals, and quickly increase in number by laying a multiplicity of eggs or nits thereon. Specifically, *Pediculus Humanus Capitis,* otherwise known as "head louse", and Phthirus Pubis, otherwise referred to as "pubic louse", migrate and multiply within the hair strands of people. Lice transfer diseases, e.g., typhus and plague; they cause fever, headaches, chills, rash, swollen lymph nodes, weakness, to name but a few harmful effects attributable to lice. Lice migrate and multiply not only a person's head hair and pubic hair, but, also in eye brows, eye strands, under arms, and other parts of the body where hair grows. Furthermore, in the event that one family member or group member contracts lice, usually, another member of the family or group, if not all, contracts lice, also. The spreading continues until action is taken to eliminate the lice.

Typically, individuals suffering from head or pubic lice receive treatment from physicians. Such treatment includes either prescription shampoos, e.g., Qwell or Nix, or "over-the-counter" treatment, e.g., Rid. These shampoos do not eliminate the live lice on the person of the individual. Additionally, all clothes and fabrics which are presumed to be infested with lice must be washed in extremely hot water in order to assure elimination of lice therefrom.

Next, a nit comb is used to run through the hair of the individual in order to dislodge and remove the nits therefrom. Nit combing commonly takes hours. The use of a nit comb, alone, is a slow, tedious, and imperfect way to dislodge and gather nits from individuals. Usually, one who performs this step uses either the naked eye, or magnifying glasses to determine if all the nits have been removed from the individual. Each stroke involves taking careful measures not to contaminate others, and to disinfect and clean the nit comb. Additionally, a plurality of combs are typically used in one treatment in order to lessen the time consumption involved therein.

The present invention as described hereinbelow provides a more efficient approach for treatment of individuals or animals infested with lice, including nits. More particularly, the present invention provides an assembly for dislodging, gathering, and suctioning lice and nits from individuals and animals.

For a more close understanding of the present invention, reference is made to the following detailed description and accompanying drawing. In the drawing, like reference characters refer to like parts throughout the several views in which:

DETAILED DESCRIPTION OF THE INVENTION

Figure 1:
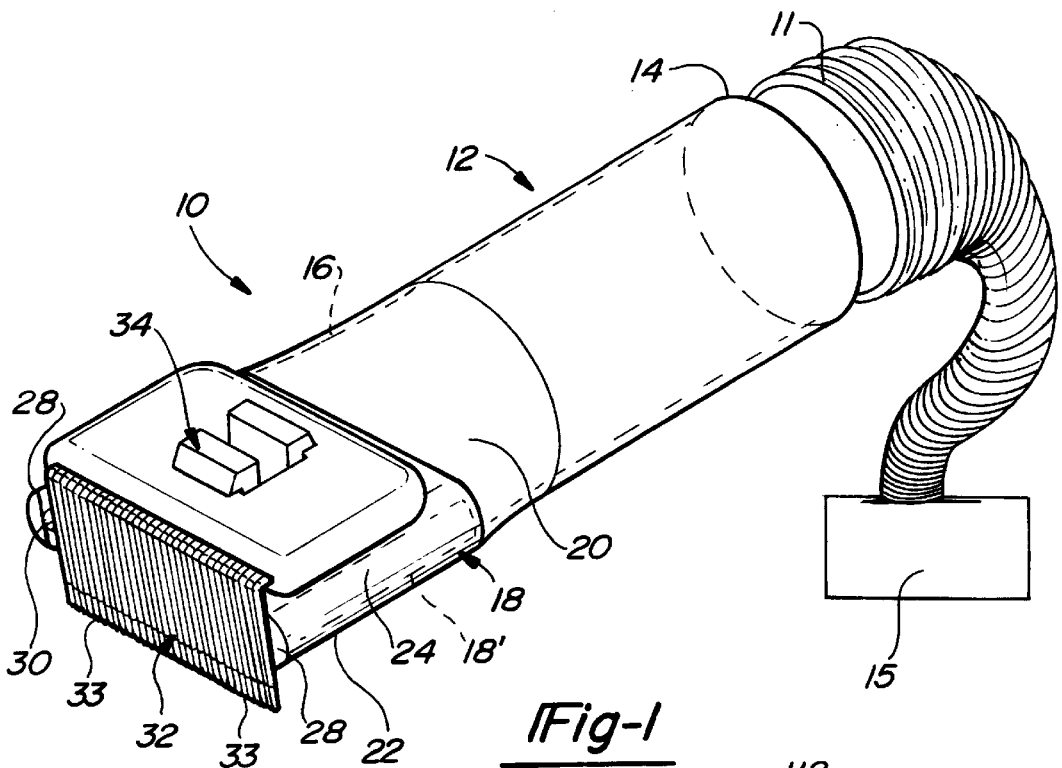
FIG. 1 is a perspective view of a preferred embodiment of a nit and louse removal device in accordance herewith.

Although not shown in the drawings, at the outset it should be noted that the nit removal device of the present system and the louse removal device are, preferably, assembled as a kit in which the devices are disposed within a suitable carrying case. As is discussed hereinbelow, each of the nit removal device and the louse removal device are vacuum actuated to remove, respectively, nits and lice from strands of hair.

Furthermore, the present invention, as further described hereinbelow, also, defines a process for employing both the nit removal device and the louse removal device.

With more particularity and as shown in the drawings of FIG. 1, there is depicted therein a nit removal device for use in accordance with the present invention and, generally, denoted at 10.

The nit removal device includes:

(a) a hollow member or body 12, the hollow member 12 having a first end 14 and a second end 16, the first end 14 is adapted to connect to a standard hose of a vacuum source; the second end 16 being opposite the first end 14;

(b) a hollow housing 18 defining an interior vacuum chamber 24 thereof for distribution of suction pressure from the hollow member 12 the housing 18 extending from the end 16 to an intake end 26;

(c) an elongated suction head 28 disposed at the intake end 26 of the vacuum chamber 24, the elongated suction head 28 having an elongated opening 30, formed therein;

(d) a nit comb 32 attached adjacent to the elongated suction head 28, the nit comb 32 having a plurality of teeth 33, the teeth 33 overlying across the elongated opening 30; and (e) connector 34 for attaching the nit comb 32 to the elongated head The nit removal device 10 may be formed from any suitable material such as high density plastic, metal, or the like.

The hollow member 12 enables the device 10 to be connected to a standard vacuum hose 11 of a vacuum source, shown schematically at 15. Preferably, the hollow member 12 is a substantially cylindrical. The first end 14 of the member 12 detachably connects to the end of a standard vacuum hose 11 of a vacuum source 15, such as by friction or the like. The first end 14 may include a substantially circular "male" connector member which, (not shown), is received in a circular "female" connector member of a standard vacuum hose. Alternatively, the first end 14 may have a substantially circular "female" connector member, (not shown).

The second end 16 of the hollow member 12 is opposite the first end 14, and is integral with the housing 18. The housing 18 is defined by a pair of side walls 18', 18", a top wall 20, and a bottom wall 22 which is integral with the member 12. The walls 18', 18", 20 and 22 cooperate to define a vacuum chamber 24 which is in fluid communication with the interior of the hollow member 12. Defined by the above-mentioned walls, the vacuum chamber 24 is a hollow, enclosed, wedge-shaped chamber which has the suction created by the vacuum source distributed thereinto. Preferably, the housing 18 flares outwardly from the hollow member 12 to define the wedge-shaped chamber. The housing, also, includes an intake end 26.

As briefly noted, an elongated suction head 28 is integrally formed and is disposed at the intake end 26 of the vacuum chamber 24. The elongated suction head 28 is in fluid communication with the chamber 24. The head 28 has an elongated opening 30 formed therein. The elongated opening 30 has a width less than that of the elongated suction head 28. The elongated opening 30 defines a primary suction intake port for nit and louse removal device 10. As detailed below, the placement of the elongated opening 30 allows for easy use of the device 10.

A nit comb 32 is attached to the elongated suction head 28. Comb 32, as is known to those skilled in the art, is a thin member with combing teeth 33 which are spaced apart from each other. The comb 32 dislodges nits and louse from the hair and scalp or skin of individuals. The comb 32 transverses the width of the elongated suction head 28 and is disposed proximate the elongated opening 30. The teeth 33 of the comb 32 overlie and extend beyond the elongated opening 30 of the elongated suction head 28, as shown. In use, the teeth 33 of the comb 32 dislodge and rake the nits and louse. The suction pressure at the elongated opening 30 suctions the nits and louse from comb 32. The comb 32 can be attached to the elongated suction head 28 by any suitable means, such as by hook and loop fasteners or the like.

One particular mode of attachment is denoted at 34 and includes a receiving member 34' disposed on the elongated suction head 28. The receiving member 34' comprises a pair of snap hooks secured to the housing 18 such that the opening in mount 35 of the comb may be snapped over the hooks 34' suspending the comb 32 in position.

Figure 2:
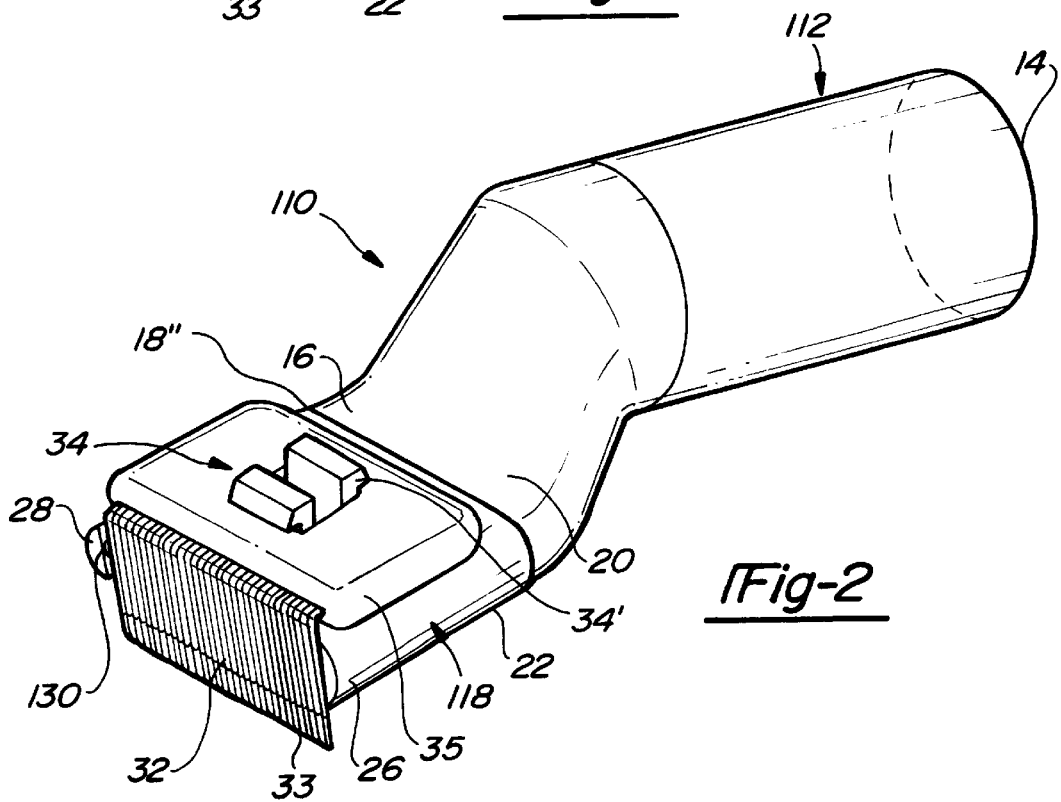
FIG. 2 is a perspective view of another embodiment of the nit and louse removal device hereof.

The teeth 33 are spaced apart sufficiently to allow strands of hair to pass through and to dislodge nits therein. In an alternate embodiment hereof, as depicted in FIG. 2 as 110, the housing chamber 118 of the device 110 is angled downwardly from the hollow member 112. The elongated opening 130, thus, is directed downwardly at an angle. In all other respects the device 110 is similar to the device 10.

Figure 3:
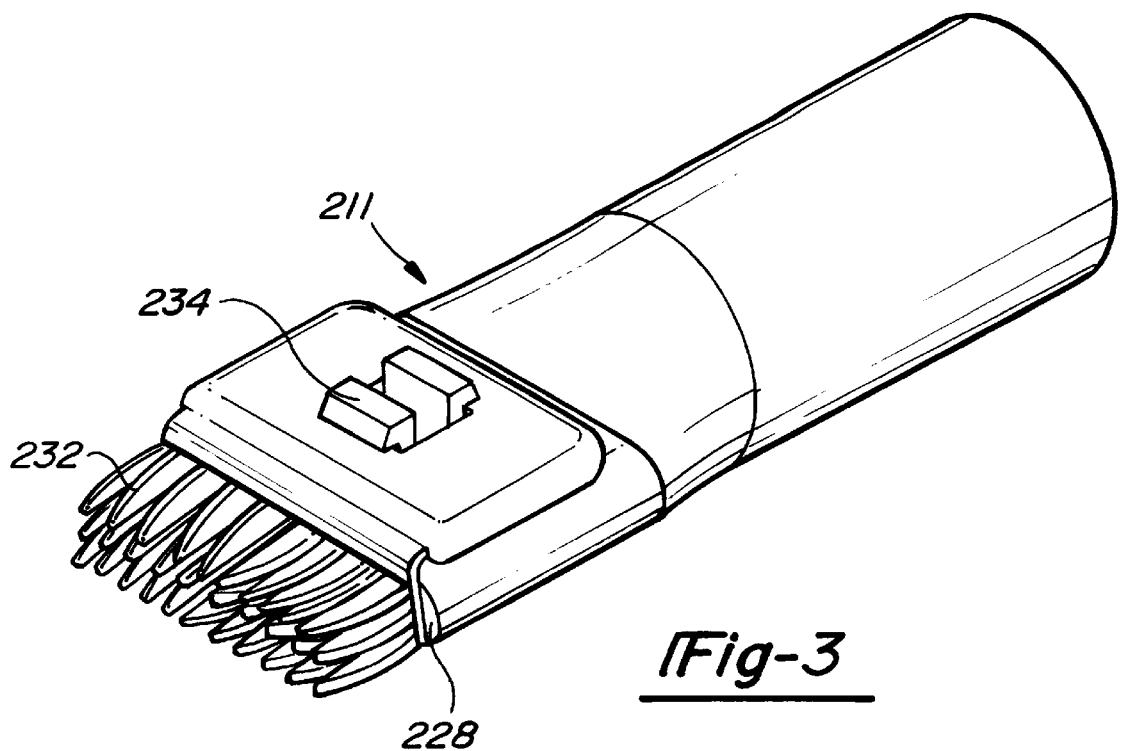
FIG. 3 is a perspective view of yet another embodiment of the nit removal device hereof.

In yet another embodiment and as depicted in FIG. 3, a nit removal device 211 has a comb 232 disposed within an elongated suction head 228 extending outwardly from head 228 generally parallel to the longitudinal axis of the device 211. The comb 232 attaches in the elongated suction head 228 by any suitable means, such as fastener 234.

In use, the nit removal device attaches, as noted above, to a standard vacuum hose of any suitable vacuum cleaner. When the suction of the vacuum cleaner is activated, the comb of the device is drawn through the hair of an individual seeking nit removal treatment. The movement of the device through the hair causes the nits to dislodge from the head and hair of the individual and harbor onto the teeth of the comb. The suction pressure from the elongated opening causes the nits to be suctioned or transported therethrough into the hose 11, and, ultimately, received in a compartment or bag of the vacuum cleaner 15. The device, as described herein, may be used on any individual or animal in any portion of the anatomy where applicable.

Figure 4:
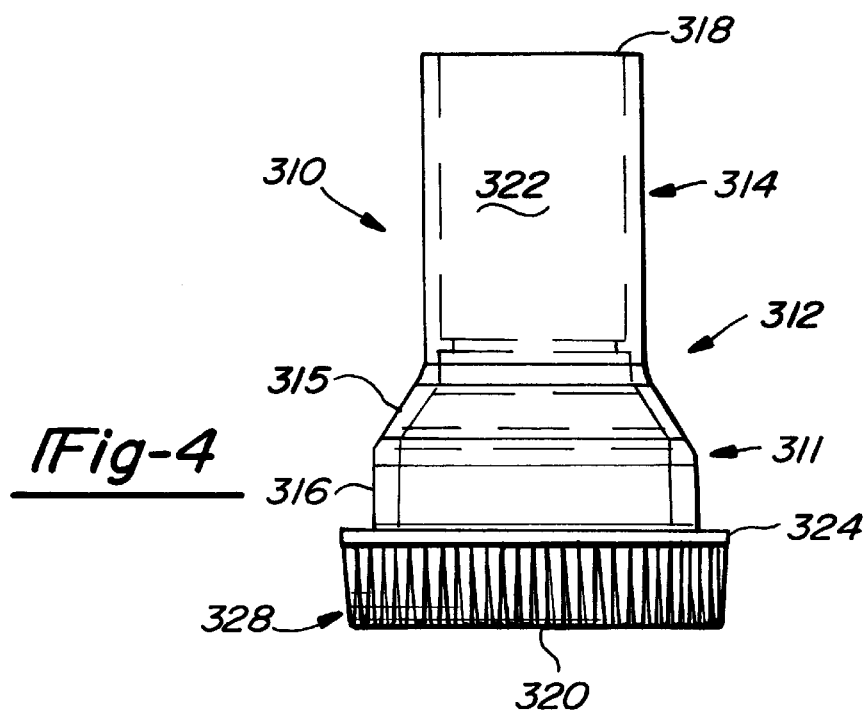
FIG. 4 is a perspective view of a louse removal device for use herein.
Figure 5:
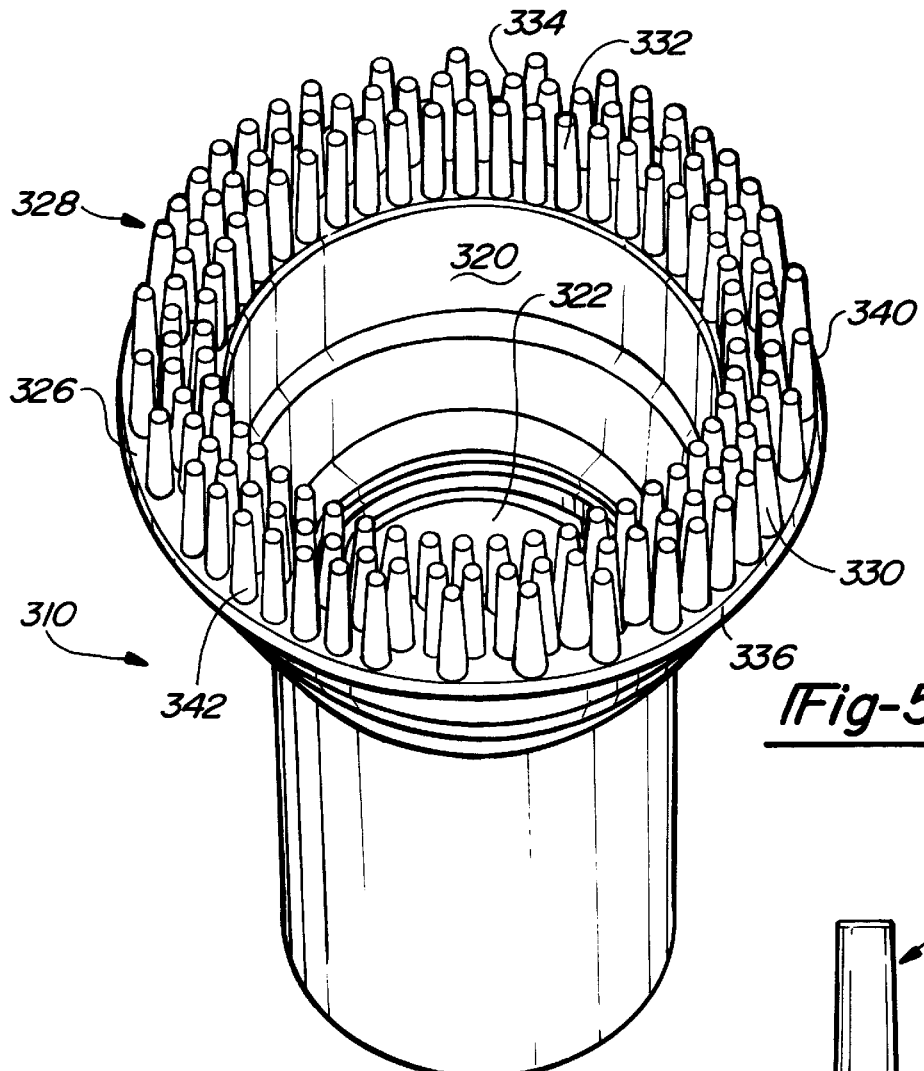
FIG. 5 is a plan view of the louse removal device of FIG. 5.

Referring now to FIGS. 4 and 5 there is depicted therein a louse and nit removal device for removing lice and nits from the strands of hair and, generally, denoted at 310.

As shown, the louse and nit removal device comprises a substantially elongated tapered cylindrical member 312 having a head portion 311, first reduced diameter portion 315, an enlarged diameter portion 316, and a neck portion 314. The reduced diameter portion 314 and the head diameter portion 311 are integrally formed to provide a unitary device.

The member 310 has a first open end 318 and an opposed or second open end 320 which cooperates, to define a hollow tunnel 322. The hollow tunnel 322 is tapered to be frictionally mounted upon a vacuum hose.

As shown in the drawing, the enlarged diameter portion 316 has a base end 324. The base end 324 is a substantially planar surface 326 and is provided with an array of circumferentially disposed teeth 328. The teeth 328 depend from and project outwardly from the base 326 about the perimeter thereof. The teeth 328 are spaced apart and in the preferred embodiment, there are approximately 140 teeth. The teeth are integrally formed with the base or may be otherwise secured thereto.

The teeth 328 protrude from surface 326 in a direction generally parallel to the longitudinal centerline of the device 310. In the preferred embodiment, the teeth are formed in rows with the first row 332 being adjacent opening 320. The second row 334 is closely adjacent row 332 and the outer row 336 is closely adjacent row 334. Each tooth 328 of each row is closely adjacent each adjacent tooth and the teeth of each row 332, 334 and 336 are offset from the teeth in an adjacent row. In this way, there is very a very small, narrow space between adjacent teeth 328. Due to this very close spacing, as the device 310 is pulled through an individual's hair, the strands of hair are separated and individually or in very small numbers, drawn between and against the teeth 328. As the strands of hair are drawn through the alternating teeth 328, the lice and nits are dislodged and sucked into the device 310 and into the vacuum hose.

To further narrow the distance between teeth 328, and still permit easy stranding of an individual's hair, the teeth 328 are tapered having a narrow top 340 and wide base 342. As should be appreciated, the narrow top 340 provides a slightly wider area between the teeth to allow the hair strands to initially enter between the teeth 328. As the hair strands are combed by teeth 328, they are drawn into the narrower area between the wider bases 342.

In the preferred embodiment of FIGS. 4 and 5, the device 310 has the following approximate dimensions. The device 310 is 3.8 inches in length. The opening 320 is 1.855 inches in diameter and the opening 318 is 1.250 inches in diameter. The surface 326 is 0.745 inches wide. The teeth 326 are 0.520 inches in length with a 0.010 radius base and 0.027 radius tip. The taper is 3 degrees. There are 49 teeth in row 332 and they are 6.667° apart as measured from radius lines. There are 54 teeth in row 334 and they are 7.347° apart as measured from radius lines. There are 38 teeth in row 336 and they are 8.887° apart.

In use the device is attached to a hose 11 and suction is applied by a standard vacuum source 15. The louse and nit removal device is combed through the hair. The louse and nit removal device is particularly useful in connection with the removal of head lice and enables the head to be vacuumed vigorously. Thus, it is desirable that the teeth be formed from a semi-rigid or flexible material to avoid injury to the user from penetration by the teeth.

In employing the present invention, the first step is to provide for the removal of live lice and nits from the head. This is done with the use of the louse removal device first. Thereafter, the nit removal device is used to remove the nits or eggs in the manner described hereinabove.

By using of the two devices, both lice and nits are effectively removed from the infested user and/or animal.

In this regard, it should be noted, that while the present invention is substantially effective in removing all lice, clearly, some lice and/or nits may be missed or not removed. These, must be removed by hand or by alternate treatment.

Figure 6:
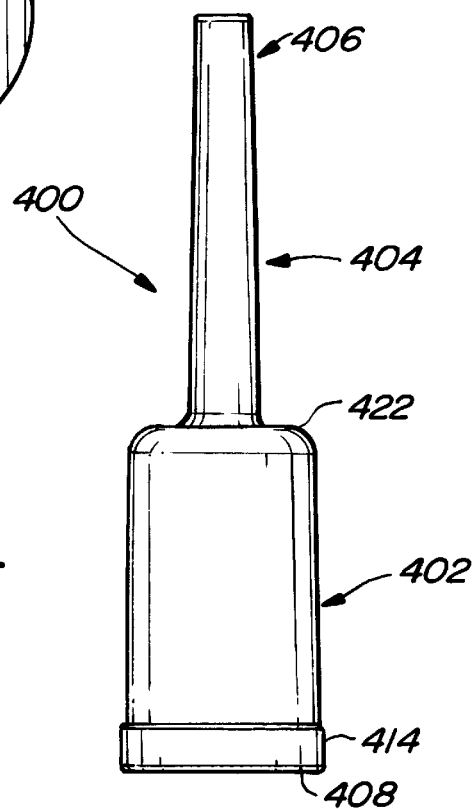
FIG. 6 is a side view of a louse removal device of the present invention.
Figure 7:
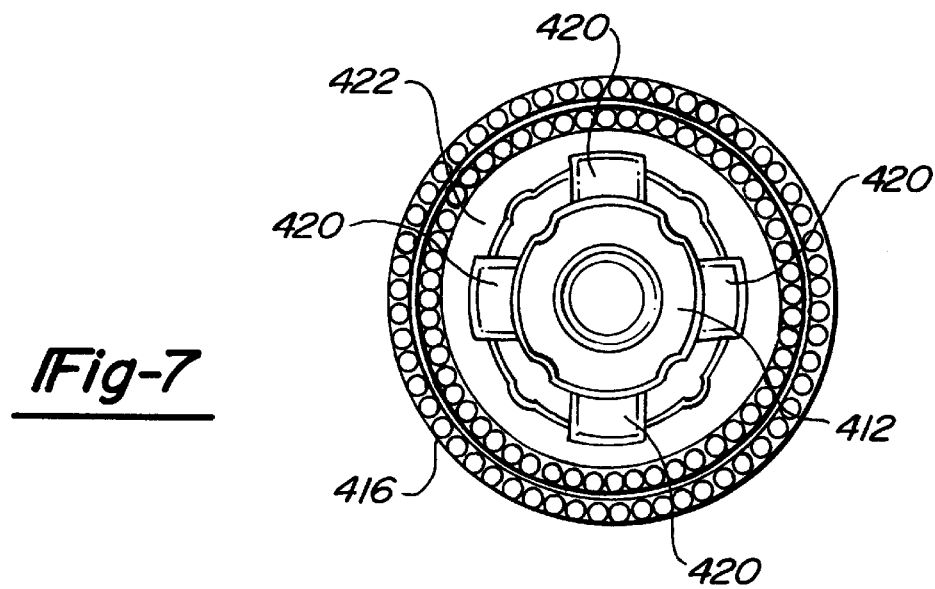
FIG. 7 is a further embodiment of a louse removal device of the present invention.
Figure 8:
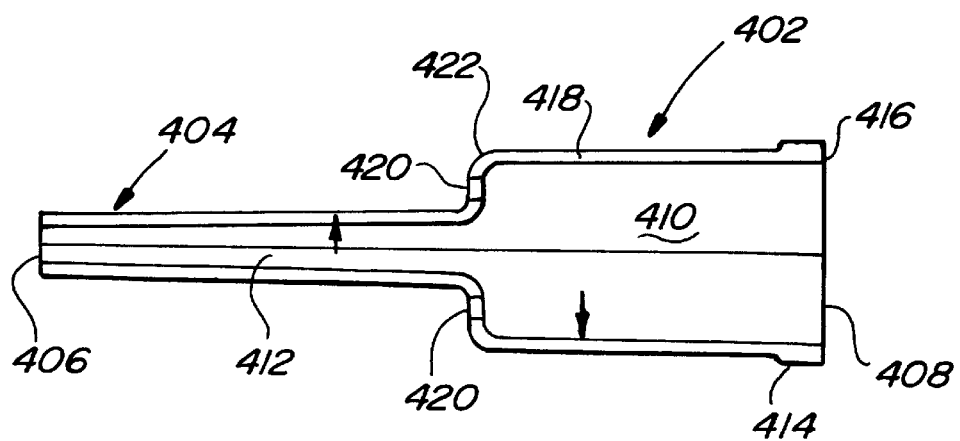
FIG. 8 is a cutaway view of the lice removal device of FIG. 6.

With reference to FIGS. 6–8, a louse removal device is illustrated. The louse removal device illustrated in FIGS. 6–8 is found to be highly effective for removing live lice. The louse removal device 400 has a head portion 402 and a neck portion 404. The neck portion 404 is tapered having a wider diameter at its junction with head portion 402 and a narrower diameter at its free end 406. The louse removal device 400 is open at both ends 406 and 408 with an interior chamber 410 being defined by the head portion and an interior chamber 412 being defined by the neck portion. The tapered neck 404 is adapted to be frictionally received by the hose 11 of a vacuum cleaner 15 so that a vacuum can be formed within interior chambers 410 and 412.

In the disclosed embodiment, the open end 408 of head portion 402 includes a flange or raised surface 414 which defines a contact surface 416. This contact surface is slightly wider than the wall 418 of head portion 402 and is adapted to engage, for example, the scalp of an individual's head. The contact surface 416 provides comfort to the individual's scalp or skin as the louse removal device 400 is moved across the individual's scalp.

Openings 420 are provided in shoulder 422 of head portion 402 to control the amount of suction within interior chamber 410. The openings 420 reduce the amount of vacuum created within chamber 410 as the louse removal device 400 is pulled across an individual's head or other area. As the vacuum is pulled in chamber 412, air can be pulled in through openings 420 reducing the vacuum within chamber 410. This is again for the comfort of the individual upon which the louse removal device 400 is being used. It should be appreciated by those of ordinary skill in the art that, if desired, the openings 420 could be covered to increase the amount of vacuum within chamber 410. The method of covering could be as simple as placing one or more fingers over the openings 420.

In the preferred embodiment of FIGS. 6–8, the following are approximate dimensions. The device is 5.5 inches long and the opening 406 is 0.250 inches in diameter and opening 408 is 1.250 inches in diameter. The surface 416 is 0.250 inches wide. The neck 404 is 3.0 inches long and the head 402 is 2.5 inches long. The openings 420 are 0.149 inches in diameter.

In use, the louse removal device 400 is attached to a hose 11 of a vacuum cleaner 15 by inserting neck portion 404 into the free end of the hose 11. The vacuum cleaner is then started to create a vacuum within chambers 410 and 412. The contact surface 416 is applied to an individual's skin and the louse removal device is moved freely across the individual's skin to remove live lice. Once the surface 416 contacts the individual's skin, the vacuum within chambers 410 and 412 literally suck the live lice into those chambers, through the vacuum hose 11 and into the vacuum cleaner 15.

In the preferred embodiment, the louse removal device 400 is made of a flexible material such as rubber in order to allow the device to flex slightly as it is moved across an individual's scalp. The main purpose for the flexibility is for the comfort of the user.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

What is claimed is:

1. A method for removing louse and nits from hair, skin and scalp, said method comprising the steps of:

a. providing a removal device having a first end adapted to be connected to a vacuum hose and a second end having a plurality of closely spaced teeth said teeth having a top and a bottom; said removal device being hollow and open at said first and second ends to permit a suction to be drawn through said removal device and through said closely spaced teeth;

b. providing a vacuum device to draw a vacuum through said hose and said removal device;

c. connecting said hose and removal device and vacuum;

d. creating a vacuum in said removal device;

e. drawing said removal device through hair and across scalp and pulling the hair between said teeth dislodging nits and louse from the hair and scalp;

f. sucking the dislodged nits and louse through said removal device, said hose and into said vacuum;

g. arranging said teeth in at least two rows adjacent said second end with said teeth in one row being offset from said teeth in an adjacent row such that said teeth are closely adjacent each other; drawing the hair through said closely adjacent teeth in the rows; and h. providing said teeth with a taper such that the bottom of said teeth are wider than the top of said teeth thereby creating a narrowing gap between said teeth from said top to said bottom of said teeth; initially inserting said tapered teeth into said hair at the top of said teeth; and pulling said removal device through said hair and drawing said hair toward said bottom of said teeth to dislodge nits and louse.

2. The method of claim 1 wherein said closely spaced teeth are mounted upon a plate which is adapted to be connected onto said second end, said method further including the step of connecting said plate to said second end.

3. A nit and louse removal device comprising:

a hollow member having a body portion and a head portion, said body portion having an open end adapted to be coupled to a vacuum hose, said head portion having an opening defining an intake;

a comb defined by a plurality of closely spaced teeth located adjacent said head portion, said comb being mounted adjacent said opening said teeth are arranged in closely adjacent rows with each tooth of each row being offset from an adjacent tooth of each adjacent row and said teeth are tapered, said teeth having a wide base tapering to a narrower free end;

whereby said device can be attached to said vacuum hose to create a suction at said intake with said teeth engaging an individual's hair strands as said comb is pulled through said individual's hair, said teeth dislodging the nits and louse and the suction sucking the dislodged nits and louse through said body into said hose.

4. The device of claim 3 wherein said body portion includes a housing defining an interior vacuum chamber.

5. The device of claim 4 wherein said vacuum chamber is wedged-shaped.

6. The device of claim 5 wherein said vacuum chamber flares outwardly from said body portion.

7. The device of claim 3 wherein said comb is removable.

8. The device of claim 3 wherein said body portion has a longitudinal centerline and said teeth of said comb extend across said intake and are perpendicular to said longitudinal centerline.

9. The device of claim 3 wherein said body portion has a longitudinal centerline and said teeth are generally parallel to said centerline.

* * * * *